United States Patent [19]

Arisaka

[11] 3,963,496

[45] June 15, 1976

[54] AUTO-PROCESS FILM UNIT WITH REMOVABLE FOLDED SHEET BETWEEN NEGATIVE AND POSITIVE ELEMENTS

[75] Inventor: Masayuki Arisaka, Minami-ashigara, Japan

[73] Assignee: Fuji Photo Film Co., Ltd., Minami-ashigara, Japan

[22] Filed: July 18, 1974

[21] Appl. No.: 489,652

[30] Foreign Application Priority Data

Aug. 3, 1973 Japan .............................. 48-87729

[52] U.S. Cl. .................................. 96/76 C; 96/201; 354/174; 354/304

[51] Int. Cl.² ..................... G03C 1/48; G03B 19/10; G03D 9/02

[58] Field of Search ............. 96/76 C, 201; 354/304, 354/174

[56] References Cited

UNITED STATES PATENTS 3,582,335 2/1964 Erlichman .......................... 96/76 C

*Primary Examiner*—David Klein
*Assistant Examiner*—Richard L. Schilling
*Attorney, Agent, or Firm*—Sughrue, Rothwell, Mion, Zinn & Macpeak

[57] ABSTRACT

An auto-process film unit comprising a photosensitive sheet and a positive image sheet, which is bondable to the photosensitive sheet, but is initially separated therefrom by a removable light-proof, anti-adhesive strip, which forms a folded portion between the photosensitive and positive image sheets, and is attached at one end to a wind-up means. This film unit has the advantage that since the photosensitive sheet for production of a negative image and a positive image sheet onto which a corresponding image is transferred are not initially bonded together, processing solution may move freely therebetween, whereby even quality of a produced photograph is ensured.

6 Claims, 4 Drawing Figures

AUTO-PROCESS FILM UNIT WITH REMOVABLE FOLDED SHEET BETWEEN NEGATIVE AND POSITIVE ELEMENTS

BACKGROUND OF THE INVENTION

1. Field of the Invention

The present invention relates to a film unit, and more particularly to an auto-process film unit ensuring even quality of prints.

2. Description of the Prior Art

There is known a type of film, which is commonly referred to as auto-process film, or by a similar appellation, and which, when employed in association with a special type of camera, makes it possible to obtain a useable photographic print almost immediately after the film has been exposed to light reflected from an object, processing and development of the film being effected automatically in the camera, and the film thus presenting the advantage that a photographer may obtain positive copies of photographed objects without further expense, or without the trouble of going to a separate establishment for film processing, and that a photographer may ascertain rapidly whether or not a particular shot has been taken satisfactorily. Successive frames of auto-process film are not provided in a continuous roll, but are constituted by individual film units, which are either completely unattached to one another, or linked by easily detachable tape, or similar means. Film units are packed in immediate succession to one another in a cassette, or pack, which is loadable in a camera, successive foremost film units being exposed, and then transferred from the pack and the camera, while being simultaneously processed. Each film unit comprises at least a photosensitive layer, which is exposable to produce a negative image of an object, a positive image layer, on which an image corresponding to the negative image may be formed by diffusion-transfer process, and a container, which holds a solution of processing chemicals, and which may be broken open by pressure means, for example, processing rolls provided in a camera, whereby the processing solution is spread between the exposed photosensitive layer and the positive image layer when the film unit is moved out of the camera. The photosensitive layer and positive image layer may be provided in a single sheet. In this case, however, each film unit must also include a lightproof layer, in order to prevent other film units from being partially exposed or blurred upon exposure of a foremost film unit. A more particular disadvantage associated with this kind of film unit is that, since the photosensitive layer and positive image layer are in very close proximity to one another, if not in immediate juxtaposition, and since processing of the exposed unit is required to be effected rapidly, unless special measures are taken, the processing solution may fail to be spread evenly through every part of the two layers, thus resulting in unevenness of quality in different portions of the completed copy. In order to overcome these disadvantages, it has been known to provide a film unit wherein a photosensitive layer and a positive image layer are constituted by independent sheets, which are initially provided separately, in forward and rear portions, respectively, of a cassette, and which are brought together to form a complete film unit only after exposure of the photosensitive sheet. However, this type of film unit has the disadvantage that construction of a camera which must be employed in association therewith is rendered very complex.

It is accordingly an object of the present invention to provide an auto-process film unit wherein even spreading of processing solution between photosensitive and positive image portions thereof is ensured.

It is another object of the present invention to provide an auto-process, film unit not requiring an incorporated opaque layer, and not requiring an associated camera of complex construction.

SUMMARY OF THE INVENTION

In accomplishing these and other objects, there is provided, according to the present invention, a film unit, which is held together with other film units in a pack loadable in a camera, and comprises a foremost photosensitive sheet, on which a negative image of an object may be formed, and which is attached along one edge to a container holding photographic processing solution, and a positive image sheet, on which an image corresponding to a negative image on the photosensitive sheet may be formed by diffusion-transfer process, which has the same breadth as, but is somewhat longer than the photosensitive sheet, which is also in attachment along one edge to the processing solution container, and which comprises a border of suitable adhesive along the three unattached edges thereof, whereby the photosensitive sheet and positive image sheet may be bonded together. However, in their initial loaded condition the photosensitive sheet and positive image sheet are not in direct attachment to one another, and are separated by a doubled portion of a lightproof, anti-adhesive sheet or strip, which has one end attached to a wind-up reel, which is provided in the film pack and is rotatable by a means provided in the camera to wind up the anti-adhesive sheet and draw it from between the photosensitive and positive image sheets of the film unit. A sealing strip is bonded to one edge of, and forms an extension to the photosensitive sheet, the combined length of the photosensitive sheet and sealing strip being approximately equal to, or slightly greater than that of the positive image sheet. On the rear side of the sealing strip, i.e., the side thereof facing the positive image sheet, there are provided two well-spaced, triangular elements, for example, near opposite ends of the sealing strip. When the photosensitive sheet is exposed to light directed through the camera lens, the anti-adhesive sheet strip is drawn from between the photosensitive and positive image sheets by the wind-up reel, whereupon the adhesive border of the positive image sheet is allowed to contact and adhere lightly to the photosensitive sheet and sealing strip. At this stage, however, the central portions of the photosensitive and positive image sheets are not bonded, and the triangular elements attached to the sealing strip cause a small hollow compartment to be constituted at one end of the assembled film unit. The film unit is subsequently transferred out of the pack by a suitable means provided in the camera, and into engagement with processing rolls, or similar means, which break open the processing solution container, and cause the processing solution to be spread between the photosensitive and positive image sheets, and simultaneously cause these sheets to be bonded firmly together. In this process, since the central portions of the photosensitive and positive image sheets are not initially bonded together, the processing solution may move freely through all parts of the film unit, and so ensure the production of a good, even-quality image on the positive image sheet, and any excess processing solution is caught in the hollow compartment at one end of the film unit. The lightproof, anti-adhesive sheet is a continuous sheet or strip which forms doubled portions, each folded respectively between the photosensitive and the positive image sheet of each successive film units in a pack, the above described process being repeated for each successive photograph taken.

In another embodiment of the invention, the lightproof, anti-adhesive sheet or continuous strip, as well as forming an integral doubled or folded portion between the photosensitive and positive image sheets of each film unit, also forms another doubled or folded portion in front of each film unit, whereby, when a film unit is exposed and removed from the pack, the next film unit is not immediately uncovered, and the pack, and remaining film units therein, may be unloaded from the camera without risk of the remaining film units being exposed.

BRIEF DESCRIPTION OF THE DRAWINGS

A better understanding of the present invention may be had from the following full description, when read in reference to the attached drawings, in which.

DESCRIPTION OF PREFERRED EMBODIMENTS

Figure 1:
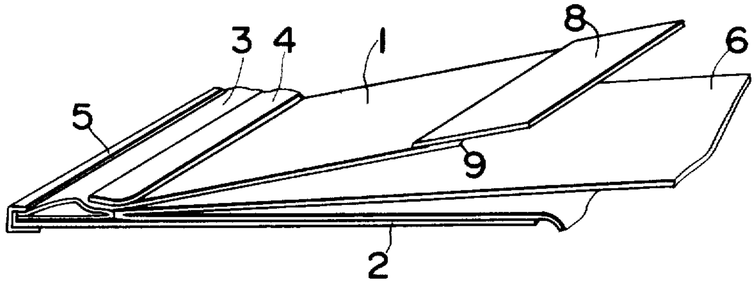
FIG. 1 is a perspective view of a film unit according to one embodiment of the present invention.
Figure 2:
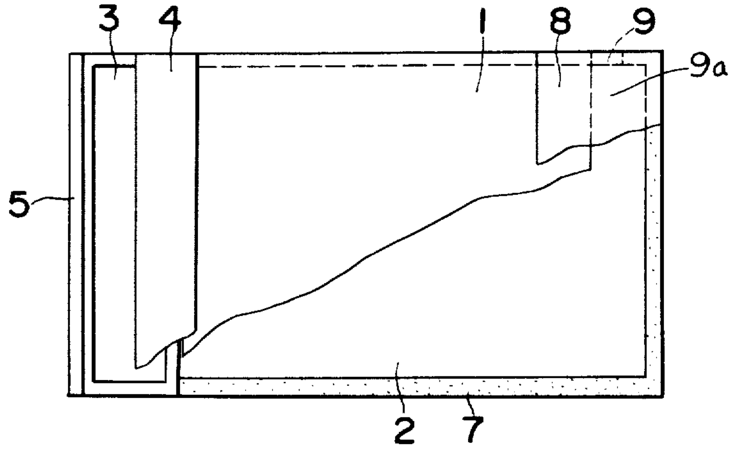
FIG. 2 is a plan view of the film unit of FIG. 1.

Referring initially to FIGS. 1 and 2, the film unit comprises a photosensitive sheet 1, which is coated with a suitable light-sensitive substance, e.g., helogenated silver emulsion, and which is positioned foremost when the film unit is loaded in a camera, that is, facing the object being photographed, a positive image sheet 2, on which an image of an object may be formed by diffusion-transfer process, and a container 3, which holds an alkali processing and developing solution, and may be broken open by pressure applied thereon, by processing rolls provided in the camera (not shown), for example. The photosensitive sheet 1 and positive image sheet 2 are equal in breadth, and the image receiving portions thereof are equal in size, but the image sheet 2 as a whole is somewhat longer than the photosensitive sheet 1. When initially loaded, the photosensitive sheet 1 and image sheet 2 are not attached to one another, but are separated by a lightproof, anti-adhesive sheet or continuous strip 6, which is described in further detail below. The processing solution container 3 is provided on the forward side of the image sheet 2, at the leading end thereof, which is indicated as the left-hand end in the drawing, FIG. 1, and is the end thereof which leads when the film unit is transferred out of a camera. Forward and foremost means facing the front of the camera towards the object being photographed and the leading end means the end first removed from the camera during processing and in this case exiting through sidewall slot 12 and moving to the left in FIG. 3. This end of the image sheet 2 is not intended to receive a portion of an image from the photosensitive sheet 1, but simply provides support for the container 3, which is held in firm attachment to the sheet 2 by a bracket-shaped grip 5. A comparatively narrow joining tape 4 is fixedly bonded along one edge to the forward side of the container 3 and along the other edge to the forward side of the leading end of the photosensitive sheet 1. A long edge of a sealing strip 8 is fixedly attached to the forward side of the other, right hand end of the photosensitive sheet 1. The sealing strip 8 forms a rightward extension to the photosensitive sheet 1, and the right-hand edge thereof is generally in line with the right hand edge of the image sheet 2. Two small, triangular spacer elements of pressable obsorption materials 9 are fixedly bonded to the rear side of the sealing strip 8, near opposite short edges thereof, the rear, face of which being faces to the front end of the photosensitive sheet 1. On the forward side of the three edges of each image sheet 2 not in contact with the container 3 there is an adhesive border 7, which, when pressure is applied, can bond the image sheet 2 to the photosensitive sheet 1 and sealing strip 8, but which is normally prevented from contacting the sheet 1 and strip 8 by the above-mentioned lightproof, anti-adhesive sheet 6, which is equal in breadth to the photosensitive sheet 1 and the image sheet 2, is folded therebetween, and whose both folds extend, at least the length of the image receiving portion of the photosensitive sheet 1.

Figure 3:
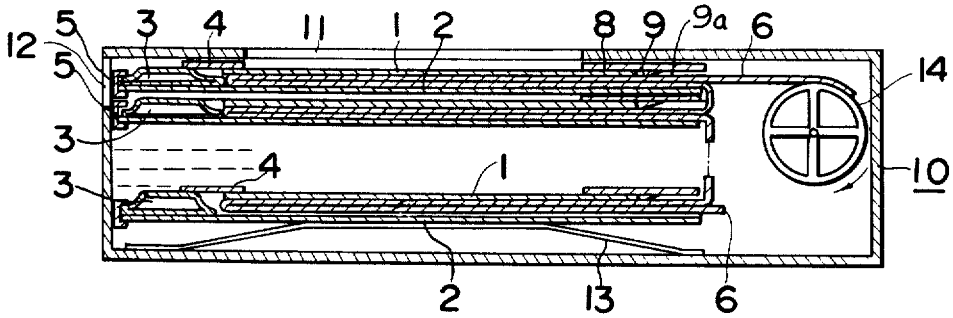
FIG. 3 is a cross-sectional, elevational view showing film units as loaded in a pack.

Referring now to FIG. 3, film units 1 are arranged in immediate succession to one another in a pack 10, which is loadable in a camera, not shown, comprising a front opening 11 through which successive foremost photosensitive sheets 1 may be exposed, and a side wall slit 12 through which successive exposed film units at a foremost position may be removed into processing rolls, remaining film units being moved successively to the foremost position in the pack, and being moved out of the pack by spring and transfer means 13, in a conventionally known manner. The pack further comprises a wind-up reel 14 which is rotatably provided in the pack at the position opposite to the side wall slit and is driven by interlinking means, not shown, provided in the camera to rotate in one direction for a certain time during each camera shutter action, which is described in further detail below. The lightproof, anti-adhesive sheet or strip 6 is a long, continuous sheet or sheet which is wound in sinous fashion to form a series of doubled or folded portions folded between the photosensitive sheet 1 and image sheet 2 of each successive film unit, to separate the photosensitive sheet 1 from the image sheet 2, and which strip has one end attached to a wind-up reel 14, the other end of the lightproof, anti-adhesive sheet or strip 6 being free. The reel 14 is provided generally in line with the foremost film unit in the pack 10 to wind up the lightproof, anti-adhesive sheet 6 and is engageable and rotatable by the interlinking means provided in the camera holding the pack.

Still referring to FIG. 3, in taking a photograph, the camera shutter is actuated, in a conventional manner, to expose the photosensitive sheet 1 of the foremost film unit in the pack loaded in the camera. At this stage, the photosensitive sheet 1 of the foremost film unit is backed by a doubled portion of the lightproof, anti-adhesive sheet or strip 6, which thus, as well as keeping the sheets 1 and 2 of the foremost film unit separated, also ensures that no portion of the light for exposure of the foremost photosensitive sheet 1 passes rearwards to expose or fog other film units. Upon termination of the camera shutter action, the reel 14 is automatically rotated by the interlinking means for a sufficient time for that portion of the sheet or strip 6, that is between the photosensitive sheet 1 and positive image sheet 2 of the foremost film unit, to be drawn from therebetween, and onto the reel 14, after which rotation of the reel 10 is stopped, the sheet or strip 6 thus still forming doubled portions in other film units. Upon removal of the folded sheet portion 6 from the foremost film unit, the adhesive border 7 of the positive image sheet 2 of the film unit is allowed to contact and adhere lightly to the photosensitive sheet 1 and sealing strip 8. When this adhesion is effected, the small triangular spacer elements 9 cause a central portion of the sealing strip 8 to stand slightly clear of the positive image sheet 2, whereby there is constituted a small, hollow compartment 9a in the assembled film unit, near the right-hand end thereof. Next, the foremost film unit is moved by a conventional removal means of a hook lever provided in the camera, (not shown) out through the pack removal slit 12, and into engagement with processing rolls (not shown), which break open the container 3 and cause the processing solution to be spread between the photosensitive and positive image sheets 1 and 2, which, prior to coming into contact with the processing rolls are not bonded firmly together, and so permit the processing solution to move freely therebetween and to all parts thereof. At the same time, the processing rolls cause the adhesive border 7 of the positive image sheet 2 to be pressed against and bond firmly to the edge portions of the photosensitive sheet 1 and sealing strip 8, and also presses the central portions of the photosensitive sheet 1 and positive image sheet 2 into firm contact, this contact being maintained by the processing solution which is suitably viscous. Prior to being brought into contact with the processing rolls, the film unit may optionally be passed between two pairs of edge rollers, (not shown), which press the adhesive border 7 into firm bonding contact with the photosensitive sheet 1 and sealing strip 8, thereby ensuring retention of the processing solution in the central, image receiving portions of the film unit during processing. Leakage of solution from the processed film unit is prevented, since any excess solution not required for production of a positive image is caught in the small compartment 9a formed at the end of the film unit. Accordingly processing and development of the film is effected automatically in the camera, so that it is possible to obtain a useable photographic positive print almost immediately after the film has been exposed to light reflected from an object.

Figure 4:
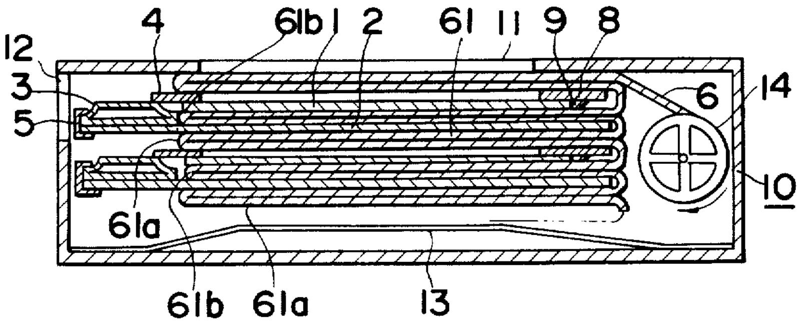
FIG. 4 is a cross-sectional, elevational view showing film units according to another embodiment of the present invention loaded in a pack.

In another embodiment of the invention shown in FIG. 4, wherein like elements to the embodiment of FIG. 3 are given like numerical designations, there is provided a lightproof, anti-adhesive sheet or continuous strip 61 which is folded or doubled in front of each film unit, as well as between the photosensitive sheet 1 and positive image sheet 2 thereof, construction otherwise being the same as described in reference to the 1st embodiment. In the 2nd embodiment, identifying each doubled portion of the sheet 6 in front of a film unit as 61*a*, and each doubled portion thereof between the photosensitive sheet 1 and positive image sheet 2 of a film unit as sheet portion 61*b*, in order to expose a foremost film unit, first, the reel 10 is actuated to wind up the foremost sheet portion 61*a* only, then the camera shutter is actuated to expose the foremost photosensitive sheet 1, after which the sheet portion 61*b* is wound by the reel 10 from out of the foremost film unit, and the film unit is transferred out of the pack, and into engagement with processing rolls, as described above. After removal of this exposed film unit, the next film unit in the pack is still covered by the next folded sheet or strip portion 61*a* in front of the photosensitive sheet 1 thereof. Thus, the pack containing the film units may be temporarily unloaded from the camera without any of the film units therein being exposed, and a new pack, containing, for example, film units having different sensitivity, or a greater number of film units, may be loaded into the camera.

As is clear from the above description, the present invention provides a film unit which is simply protected from unrequired exposure, and which ensures even spreading of processing solution, and hence even quality of a produced print.

Although the present invention has been fully desclosed in conjunction with the various preferred embodiments thereof changes and modifications are apparent to those skilled in the art. In any way, such changes and modifications should be, unless they depart from the time scope and sprint of the present invention, construed as included therein.

What is claimed is:

1. In a film unit which comprises a photosensitive sheet, an underlying positive image sheet, and a breakable container at the leading end of said unit in terms of the direction of unit movement during processing and holding a photographic processing solution, and which provides a positive print upon exposure of said photosensitive sheet, and transfer of the film unit forwardly during such movement through pressure means which cause said container to be broken open and processing solution to be spread rearwardly of said pressure means in a thin layer between said photosensitive sheet and said positive image sheet, the improvement wherein; said positive image sheet comprises adhesive portions for bonding thereof to said photosensitive sheet, said photosensitive sheet and said positive image sheet are each attached along one edge to said container, and are separated from one another prior to exposure of said photosensitive sheet by a removable, lightproof, folded, anti-adhesive continous strip including a doubled portion positioned therebetween, each layer of which having dimensions matching those of the light-sensitive portions of said film unit and respectively contacting said photosensitive sheet and said positive image sheet and being removable after exposure of said photosensitive sheet, whereby said photosensitive sheet and said positive image sheet may be then bonded together during passage through a processing pressure means, and processing solution may move easily therethrough.

2. A film unit as recited in claim 1, which further comprises laterally spaced spacer elements provided between trailing, initially unattached ends of said photosensitive sheet and said positive image sheet for said unit, whereby, when said doubled portion of said anti-adhesive continuous strip is removed from said photosensitive sheet and said positive image sheet, said sheets are bonded together, and there is formed a compartment for reception of excess processing solution at the rear end of said film unit, and hence even quality of a produced print.

3. In a film pack comprising multiple film units, each film unit which comprises a photosensitive sheet, an underlying positive image sheet, and a breakable container at a leading end of said unit relative to its direction of movement during processing and holding a photographic processing solution, and which provides a positive print upon exposure of said photosensitive sheet, and transfer of said film unit forwardly during processing through pressure means which causes said container to be broken open and processing solution to be spread rearwardly of said pressure means in a thin layer between said photosensitive sheet and said positive image sheet, the improvement wherein said positive image sheet comprises adhesive portions for bonding thereof to said photosensitive sheet, said photosensitive sheet and said positive image sheet are each attached along one edge to said container, and are separated from one another prior to exposure of said photosensitive sheet by a first doubled portion of a continuous removable, lightproof, anti-adhesive strip, each layer of which having dimensions matching those of the light-sensitive portion of said film unit, said photosensitive sheet being covered by one layer of said lightproof, anti-adhesive first doubled strip portion having dimensions matching those of the light-sensitive portion of the photosensitive sheet, and a second doubled strip portion of said lightproof, anti-adhesive strip being positioned in front of said photosensitive sheet of each unit, whereby for each unit, said second doubled strip portion may be first removed from the front of said photosensitive sheet before exposure of said photosensitive sheet to premit exposure, and then, said first strip portion may be removed from between said photosensstive sheet and said positive image sheet after exposure of said photosensitive sheet to permit said photosensitive sheet and said positive image sheet to be bonded together upon being passed through said processing pressure means, and the processing solution may be moved easily therebetween.

4. The film pack as claimed in claim 3, wherein said second strip portion comprises two equally sized layers.

5. The film pack as claimed in claim 4, further comprising a wind up reel mounted for rotation about an axis extending laterally across said unit adjacent the trailing end of each unit with one edge of said second strip portion being attached to the periphery of said reel; whereby, rotation of said reel first removes said second folded strip portion from the front of the foremost photosensitive sheet and subsequently removes said second folded strip portion from between said photosensitive sheet and said positive image sheet.

6. The film unit as claimed in claim 1, further comprising a wind up reel mounted for rotation about an axis extending laterally of said unit at the trailing end thereof with one edge of the foremost portion of said light-proof anti-adhesive strip being attached to the periphery of said reel; whereby, rotation of said reel removes said folded light-proof, anti-adhesive strip from between said photosensitive sheet and said positive image sheet.

* * * * *